Patented Aug. 12, 1924.

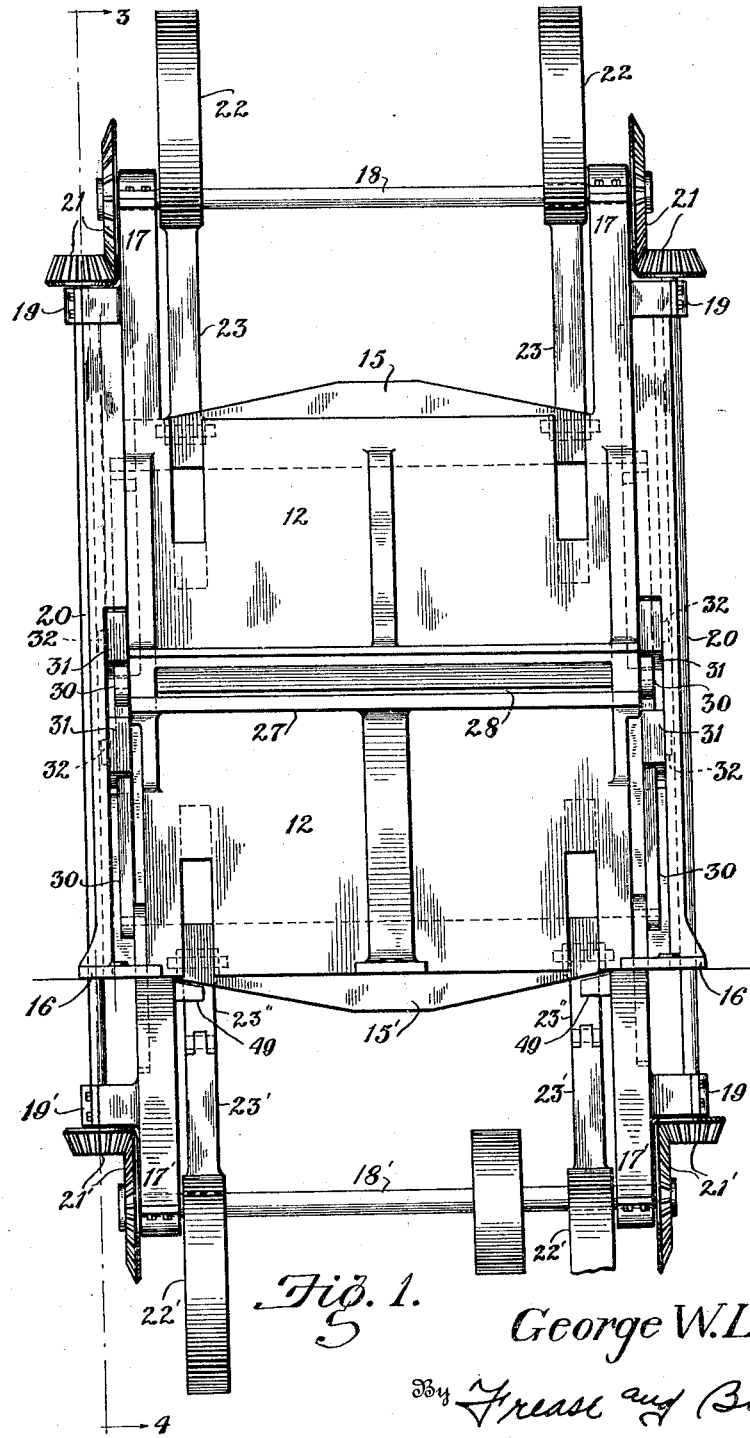

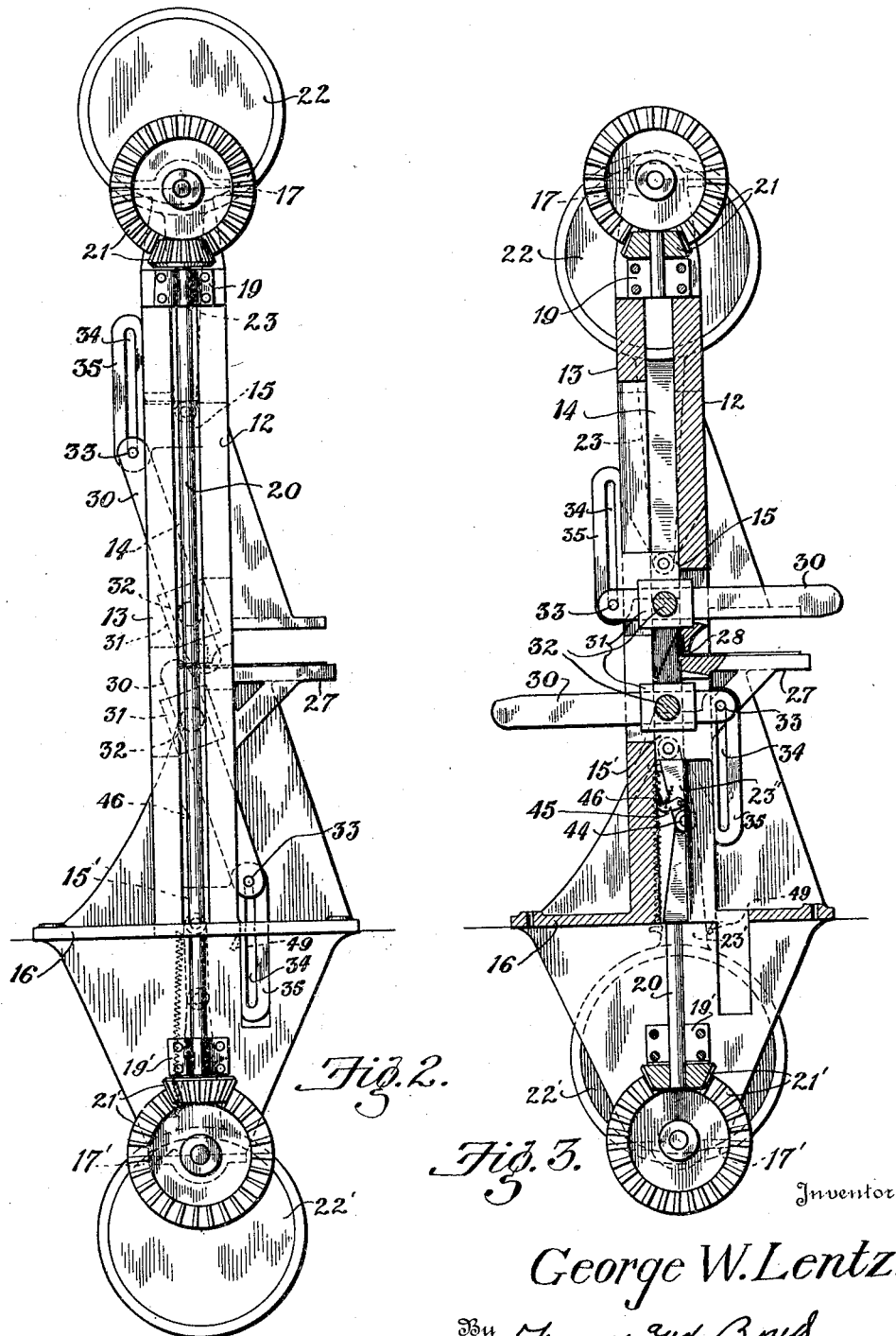

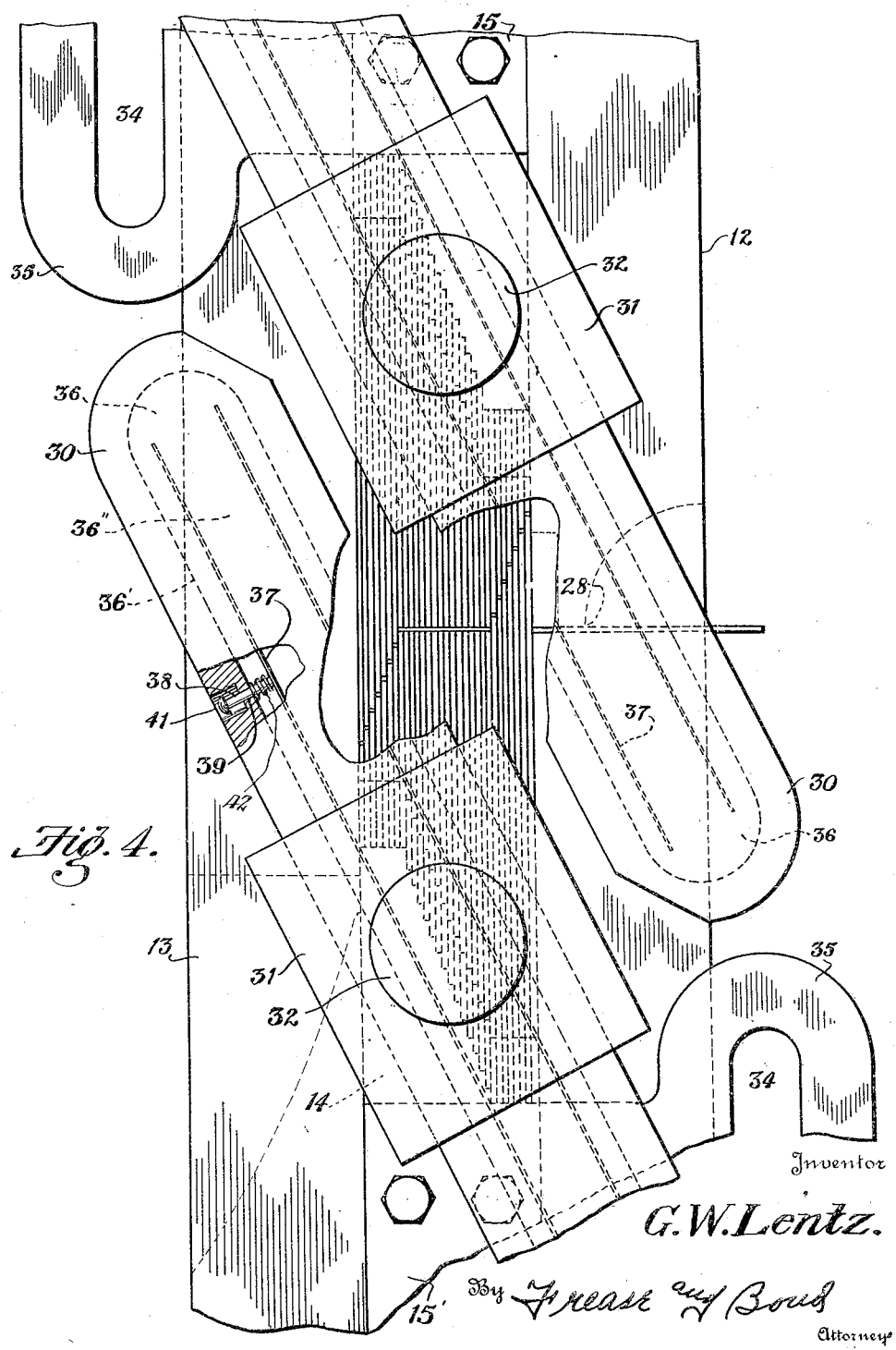

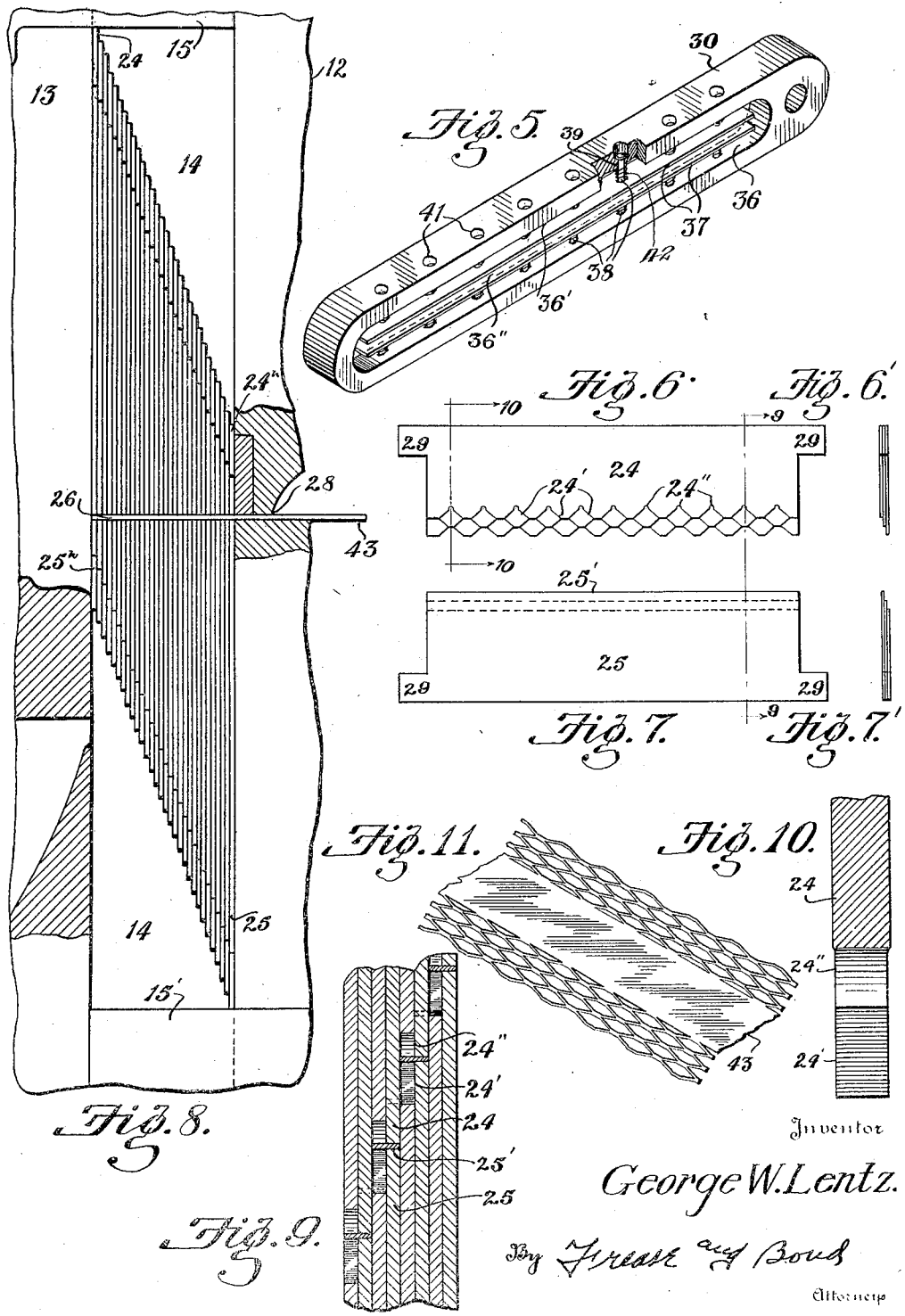

1,504,629

UNITED STATES PATENT OFFICE.

GEORGE W. LENTZ, OF CANTON, OHIO.

EXPANDED-METAL MACHINE.

Application filed October 6, 1923. Serial No. 666,942.

*To all whom it may concern:*

Be it known that I, GEORGE W. LENTZ, a citizen of the United States, residing at Canton, in the county of Stark and State of Ohio, have invented certain new and useful Improvements in Expanded-Metal Machines, of which the following is a specification.

The invention relates to machines for slitting and expanding metal sheets by the method set forth in the Golding Patent No. 527,242 of October 9, 1894, and the object of the improvement is to slit and expand an entire sheet by a single cycle of operations of a reciprocating machine.

In carrying out the Golding process referred to, it has been customary to use a single set of cutting knives or shearing blades for slitting and expanding a single lineal series or row of strands by a reciprocating operation of the knives or plates, after which the sheet is moved or fed intermittently side-wise for a successive series of similar operations until the entire sheet has been slit and expanded.

The present improvement involves the use of a plurality of sets of cutting and shearing blades, operatively mounted face to face, for slitting and stretching successive rows of strands from one side edge to the other of a sheet, or preferably from opposite side edges to the middle of a sheet, by a single cycle of operations during which the sheet remains in situ, excepting as its strands and bonds are displaced by the expanding operation.

The improvement also includes means for successively operating the cutting and shearing blades for the slitting and expanding operations, and means for returning the same to normal position upon the completion of these operations; so that an entire sheet may be slit and expanded by a single cycle of such operations.

The invention may be embodied in the form of machine illustrated in the accompanying drawings, forming part hereof, in which—

Figure 1 is a front elevation of the machine;

Fig. 2, a left end elevation of the same with the expanding mechanism in normal position;

Fig. 3, an elevation section of the same as on line 3—4, Fig. 1, showing the expanding mechanism in operated position.

Fig. 4, an enlarged similar elevation as on line 3—4, Fig. 1, showing the expanding mechanism at an intermediate position of operation, with parts broken away to show structural details;

Fig. 5, a detached perspective view of one of the return bars;

Figs. 6 and 6' are side and end views of several cutting blades;

Figs. 7 and 7' are side and end views of several shearing blades;

Fig. 8 is an end view of the cutting and shearing blades arranged in normal position;

Fig. 9, a fragmentary section as on line 9—9, Figs. 6 and 7, showing the blades in operated position;

Fig. 10, a fragmentary section on line 10—10, Fig. 6 of one cutting blade; and

Fig. 11, a fragmentary perspective view showing a sheet as it appears in an intermediate stage of expansion, with a portion of each side expanded in opposite directions as when the machine is in the position shown in Fig. 4.

Similar numerals refer to similar parts throughout the drawings.

The machine may have a housing including an upright front plate or frame 12 and an upright back plate or frame 13, spaced apart in parallel relation to form a guide way 14 having upper and lower plungers 15 and 15' therein; and at each end the upright plates may be connected together by foot plates 16 extending forward and rearward for bearing upon suitable supports, not shown.

On top of the housing are mounted bearings 17, one at each end, carrying a shaft 18; and depending from the housing are bearings 17', one at each end, carrying a shaft 18'. At each end of the housing are provided, above and below, bearings 19 and 19' carrying shafts 20, which are operatively connected with the shafts 18 and 19 by bevel gears 21 and 21', as well shown in Fig. 1.

Eccentrics 22 are mounted on the shaft 18, and have pitmans 23 connected with the upper plunger 15 at each of the ends thereof; and eccentrics 22' are mounted on the shaft 18', and have link pitmans 23' and 23'' connected with the lower plunger 15' at each end thereof. The parts are so arranged that an operation of the shafts will reciprocate the plungers toward and from each other in the guide-ways 15 between the front and back frames 12 and 13.

A series of cutting blades 24 to $24^n$, located face to face, are mounted in the upper part of the guide way 14 below the upper plunger 15 therein; and a series of shearing blades 25 to $25^n$, located face to face, are mounted in the lower part of the guide way 14 above the plunger 15' therein. The plates in each set are made of gradually increasing width so that when arranged in a pack with one edge of each plate in square alignment, the other edge of the plate will be in stepped alignment, and vice versa. As shown in Fig. 8, the normal arrangement of the two series of plates is shown.

Each of the cutting plates 24 is provided with a series of truncated V-knives 24' with intervening notches 24'' for cutting a row of interrupted slits against a straight edge 25' of one of the shearing blades 25, in well known manner; and the V-knives of alternate cutting plates are arranged in staggered relation, so that the interrupted slits cut by successive blades will also be in staggered relation, also in well known manner.

As shown in Fig. 8, the sets of plates are normally arranged so that the truncated ends of the knives 24' on the lower edges of the cutting blades will all be located in the same horizontal plane; and the edges 25' of the shearing blades 25 will also be located in an adjacent horizontal plane. The planes of these edges are spaced apart to form a horizontal channel 26 of sufficient depth to freely receive a metal sheet blank for slitting and expanding the same.

A sheet may be entered into the channel 26 over a table 27 mounted on the front frame 13 of the housing, through a horizontal slot 28 provided in the front frame for that purpose. The length of the cutting and shearing plates and the width of the series thereof, are such that the channel 26 between them will receive the whole length and width of a metal sheet, so that it can be operated upon throughout its whole extent during one cycle of operation of the machine.

A tongue 29 is provided on each end of each cutting and shearing blade, respectively at the upper and lower corners thereof, and these tongues protrude beyond the ends of the plate proper so as to be engaged by means for returning the plates to normal position after an operation of the machine. Such means may include a pair of blade controlling plates 30, one at each end of each set of blades, mounted for sliding endwise in guide blocks 31 pivoted by trunnions 32 in the ends of the housings adjacent to the ends of the cutting and shearing plates. One end of each controlling plate is provided with a wrist pin 33 operating in an elongated bearing slot 34 provided in a bracket 35 secured to the end of the corresponding plunger.

On the inner side of each blade controlling plate is provided an elongated channel 36, in each side of which is mounted a presser bar 37 having a series of guide rods 38 movable endwise in guide ways 39 provided in the plates, there being heads on the guide rods 38 operating in counterbores 41 to limit the inward movement of the bars 37, and there being coil springs 42 around the rods between the sides 36' of the channel and the bars 37, acting to press the bars inward toward each other.

There is thus provided an elongated slot 36'' between the bars 37 for receiving the tongues of the respective series of blades, and the pressure of the coil springs causes the bars to press against the edges of the tongues, whether the same extend directly across the slot or are positioned diagonally therein.

In the operation of the machine, a metal sheet 43 is fed side ways through the slot 28 in the front plate of the housing into the horizontal way 26, between the cutting blades above and the shearing blades below, as shown in Fig. 8. The machine is operated to move the plungers toward each other, with the result that the upper plunger first impinges the widest cutting blade which, as shown, is located at the back of the machine, and the lower plunger impinges the widest shearing blade which, as shown, is located at the front of the machine.

The widest blades are thus driven downward and upward respectively, so as to slit and expand a row of strands at the edge of the sheet; the slitting and expanding action being against the next contiguous blade of the opposing series, while the corresponding blade of the opposing series is driven from its normal position. A further movement of the plungers toward each other, slits and expands successive rows of strands, by impinging successive rows of blades until all the blades of the series have been acted upon and the metal sheet has been slit and expanded throughout its whole extent, and the blades have been driven by the plungers into operated position, as shown in Fig. 3.

The normal position of the controlling plates corresponds to the inclination of the rows of tongues on the cutting and shearing blades, as shown in Fig. 1; and as the plungers are operated toward each other the tongues of the blades carry the controlling plates with them from the normal inclined position to the horizontal position shown in Fig. 3 when the machine has reached the operated position; in which movement the controlling blades slide in their guide blocks as they are guided by the wrist pins 33 moving in the slots 34.

The parts are so arranged that in the operated position of the controlling plates the presser bars 37 abutting the inner edges of the tongues 29, are pressed toward the corresponding side of the channel by a compression of the springs 42 for the purpose presently to be explained; which is the position of these parts when the slitting and expansion has been completed, as shown in Fig. 3.

For the purpose of removing the expanded sheet from the machine the lower pitman is composed of links 23' and 23" which are normally stopped slightly in rear of the toggle joint 44 which is arranged to be stopped slightly in rear of dead center; and on the upper link 22, 23" is provided a spring dog 45 arranged to operate against a cam lug 46 to throw the toggle joint forward from dead center immediately at the instant the plunger 15' has been driven by the eccentric 22' into operated position; whereupon the lower plunger 15' is suddenly drawn downward by the strong spring 27 and a swinging of the toggle joint as shown in Fig. 3, whereupon the spring bar 37 in the lower controlling plates acts by pressure of the springs 42 against the upper edges of the tongues 29, all of which shearing blades move the same downward a sufficient distance to open a channel between the shearing edges and the knife edges of the cutting blades so that the expanded sheet may be freely removed from the machine through a horizontal slot 48 provided for that purpose in the rear plate of the housing.

During the forward operation of the machine the toggle joint 44 may be thrown rearward into normal position by a guide finger 49 and the plungers are operated away from each other; during which movement the controlling plates are carried by their wrist pin 33 bearing in the ends of the slots 34 from their horizontal operated position to their inclined normal position and in this operation of the controlling plates the cutting and shearing blades are carried by their tongues engaged in the slots between the bars 37 into normal position for another operation of the machine; it being understood that the parts may be so arranged that the yielding bars 37 bearing against the inner edges of the tongues 29 will operate against stops to positively carry the blades into normal position at the end of the return operation.

The knife portions of the cutting blades are preferably reduced in thickness to the extent of the cutting and expanding stroke, for giving the clearance which may be necessary or desirable for cooperating with corresponding edges of the shearing blades, as shown for the cutting blades in Fig. 10; and it is evident that the machine can be used to slit and expand a plurality of sheets placed together in a pack, by a single cycle of operations of the cutting and shearing blades, actuated by simultaneous single strokes of the plungers.

It will be understood that an unexpanded marginal edge of the sheet may be extended laterally beyond the zone of the cutting blades, and that the same may be headed or ribbed by suitable dies, either in the same machine or in a different machine, in well known manner; and with this in view, the use of the terms "side edge", and "side edges" of the sheet in the description and claims is intended to be inclusive of the edge portions of the sheet.

I claim:

1. The method of expanding metal sheets which consists in slitting and simultaneously expanding entire rows of strands and bonds to form diamond mesh successively from one side edge of the sheet toward the other side edge thereof while the unexpanded portion of the sheet remains in situ.

2. The method of expanding metal sheets which consists in slitting and simultaneously expanding entire rows of strands and bonds to form diamond mesh from each side edge of the sheet toward the center thereof by displacing the expanded mesh in opposite directions from the plane of the sheet in opposite sides thereof while the unexpanded portion of the sheet remains in situ.

3. A machine for expanding metal sheets including means for slitting and simultaneously expanding entire rows of strands and bonds to form diamond mesh successively from one side edge of the sheet toward the other side edge thereof and holding the unexpanded portion of the sheet in situ.

4. A machine for expanding metal sheets including means for slitting and simultaneously expanding entire rows of strands and bonds to form diamond mesh successively from each side edge of the sheet toward the center thereof by displacing the expanded mesh in opposite directions from the plane of the sheet in opposite sides thereof and holding the unexpanded portion of the sheet in situ.

5. A machine for expanding metal sheets including a plurality of sets of cutting and shearing blades operatively mounted face to face for slitting and simultaneously expanding entire rows of strands and bonds to form diamond mesh successively from one side edge of the sheet toward the other side edge thereof and holding the unexpanded portion of the sheet in situ.

6. A machine for expanding metal sheets including a plurality of sets of cutting and shearing blades for cutting and simultaneously expanding entire rows of strands and bonds to form diamond mesh successively from each side edge of the sheet toward the center thereof by displacing the expanded mesh in opposite directions from the plane of the sheet in opposite sides thereof and holding the unexpanded portion of the sheet in situ.

7. A machine for expanding sheets including a plurality of sets of cutting and shearing blades operatively mounted face to face with their cutting and shearing edges normally located in parallel planes spaced from each other, and means for successively actuating the blades for slitting and simultaneously expanding entire rows of strands and bonds to form diamond mesh successively from one side edge of the sheet toward the other side edge thereof.

8. A machine for expanding metal sheets including a plurality of sets of cutting and shearing blades operatively mounted face to face with their cutting and shearing edges normally located in parallel planes spaced from each other, and means for successively actuating the blades for slitting and simultaneously expanding entire rows of strands and bonds to form diamond mesh successively from each side edge of the sheet toward the center thereof.

9. A machine for expanding metal sheets including a plurality of sets of cutting and shearing blades for differential widths operatively mounted face to face with their cutting and shearing edges normally located in parallel planes spaced from each other, and means successively actuating the blades for slitting and simultaneously expanding entire rows of strands and bonds to form diamond mesh successively from one side edge of the sheet toward the other side edge thereof.

10. A machine for expanding metal sheets including a plurality of sets of cutting and shearing blades of differential widths operatively mounted face to face with their cutting and shearing edges normally located in parallel planes spaced from each other, and means for successively actuating the blades for slitting and simultaneously expanding entire rows of strands and bonds to form diamond mesh successively from each side edge of the sheet toward the center thereof.

11. A machine for expanding sheets including a plurality of sets of cutting and shearing blades operatively mounted face to face with their cutting and shearing edges normally located in parallel planes spaced from each other, means for successively actuating the blades for slitting and simultaneously expanding entire rows of strands and bonds to form diamond mesh successively from one side edge of the sheet toward the other side edge thereof, and means for returning the blades to normal position after an expanding operation thereof.

12. A machine for expanding metal sheets including a plurality of sets of cutting and shearing blades operatively mounted face to face with their cutting and shearing edges normally located in parallel planes spaced from each other, means for successively actuating the blades for slitting and simultaneously expanding entire rows of strands and bonds to form diamond mesh successively from each side of the sheet toward the center thereof and means for returning the blades to normal position after an expanding operation thereof.

13. A machine for expanding sheets including a plurality of sets of cutting and shearing blades operatively mounted face to face with their cutting and shearing edges normally located in parallel planes spaced from each other, means for successively actuating the blades for slitting and simultaneously expanding entire rows of strands and bonds to form diamond mesh successively from one side edge of the sheet toward the other side edge thereof, and means coordinated with the actuating means for returning the blades to normal position after an expanding operation thereof.

14. A machine for expanding metal sheets including a plurality of sets of cutting and shearing blades operatively mounted face to face with their cutting and shearing edges normally located in parallel planes spaced from each other, means for successively actuating the blades for slitting and simultaneously expanding entire rows of strands and bonds to form diamond mesh successively from each side of the sheet toward the center thereof, and means coordinated with the actuating means for returning the blades to normal position after an expanding operation thereof.

15. A machine for expanding sheets including a plurality of sets of cutting and shearing blades operatively mounted face to face with their cutting and shearing edges normally located in parallel planes spaced from each other, means for successively actuating the blades for slitting and simultaneously expanding entire rows of strands and bonds to form diamond mesh successively from one side edge of the sheet toward the other side edge thereof, and means for separating the cutting and shearing edges of the blades after an expanding operation thereof for removing the expanded sheet from between the same.

16. A machine for expanding metal sheets including a plurality of sets of cutting and shearing blades operatively mounted face to face with their cutting and shearing edges normally located in parallel planes spaced from each other, means for successively actuating the blades for slitting and simultaneously expanding entire rows of strands and bonds to form diamond mesh successively from each side of the sheet toward the center thereof, and means for separating the cutting and shearing edges of the blades after an expanding operation thereof for removing the expanded sheet from between the same.

GEORGE W. LENTZ.